United States Patent [19]

Sayo et al.

[11] 4,150,738
[45] Apr. 24, 1979

[54] ELECTROMAGNETIC CLUTCH

[75] Inventors: Kosaku Sayo, Katsuta; Seijiro Tani, Naka; Atsushi Suginuma, Hitachi, all of Japan

[73] Assignee: Hitachi, Ltd., Japan

[21] Appl. No.: 748,503

[22] Filed: Dec. 8, 1976

[30] Foreign Application Priority Data

Dec. 8, 1976 [JP] Japan .................... 50-145088

[51] Int. Cl.$^2$ ........................................... F16D 27/06
[52] U.S. Cl. ........................... 192/84 C; 192/110 R
[58] Field of Search .................. 192/84 C, 110 R

[56] References Cited

U.S. PATENT DOCUMENTS

| | | | |
|---|---|---|---|
| 3,082,933 | 3/1963 | Bernard | 192/84 C |
| 3,703,227 | 11/1972 | Murakami et al. | 192/110 R |
| 3,724,621 | 4/1973 | Heidorn | 192/84 C |
| 3,743,068 | 7/1973 | Westervelt et al. | 192/84 C |
| 3,752,279 | 8/1973 | Briar | 192/84 C |
| 3,774,739 | 3/1972 | Higuchi | 192/84 C |
| 3,876,048 | 4/1975 | Briar | 192/84 C |
| 3,995,244 | 11/1976 | Sayo | 192/84 C |

*Primary Examiner*—Henry C. Yuen
*Attorney, Agent, or Firm*—Craig & Antonelli

[57] ABSTRACT

An electromagnetic clutch comprises a pulley rotatable about a shaft, an armature which is axially movably connected to the shaft and faces a portion of the pulley so as to contact with electromagnetic force thereby coupling the pulley and the shaft, an electromagnet with a winding and a core which has cylindrical face coaxial of the shaft, a part of which core faces to a part of the pulley with small air gap so as to make magnetic circuit, a supporting member which has a cylindrical portion surrounding the shaft with a gap and rotatably supporting the pulley through a bearing, and a flange portion spreading out from the one end of the cylindrical portion. The supporting member is secured to the core of the electromagnet with the flange portion tightly inserted in the cylindrical face of the core, thereby defining an electromagnetic assembly in which a recess for engagement with a machine is formed. The core is precisely press-formed, and the electromagnetic assembly is precisely machined at the outer face of the cylindrical portion of the supporting member and at the recess, on basis of the core. By energizing the winding a magnetic circuit is produced whereby magnetic flux passes through the core, the pulley, and the armature so that the armature is attracted to the pulley to contact therewith.

16 Claims, 4 Drawing Figures

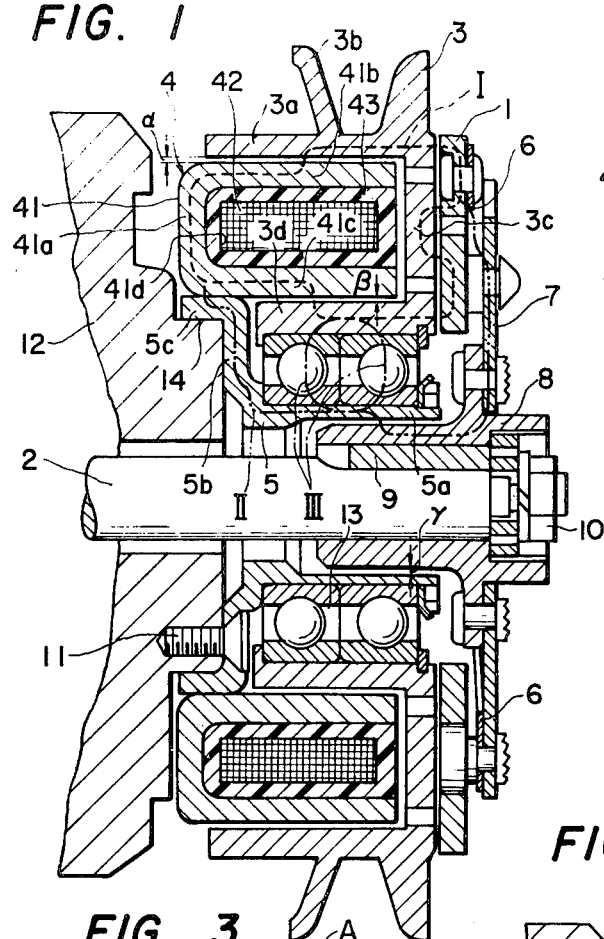
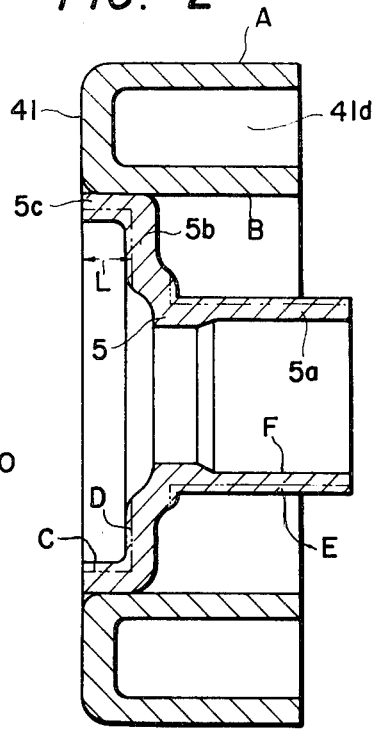
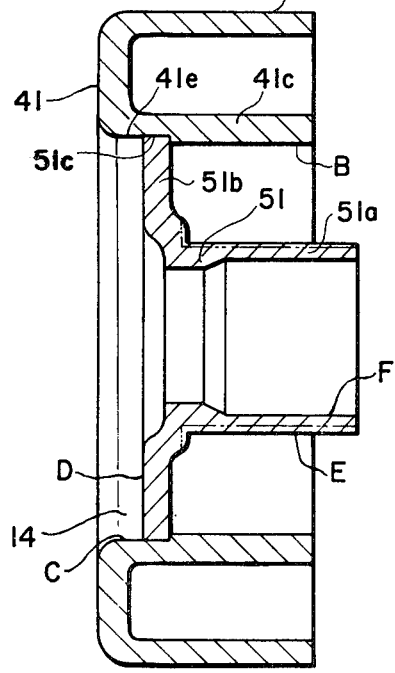
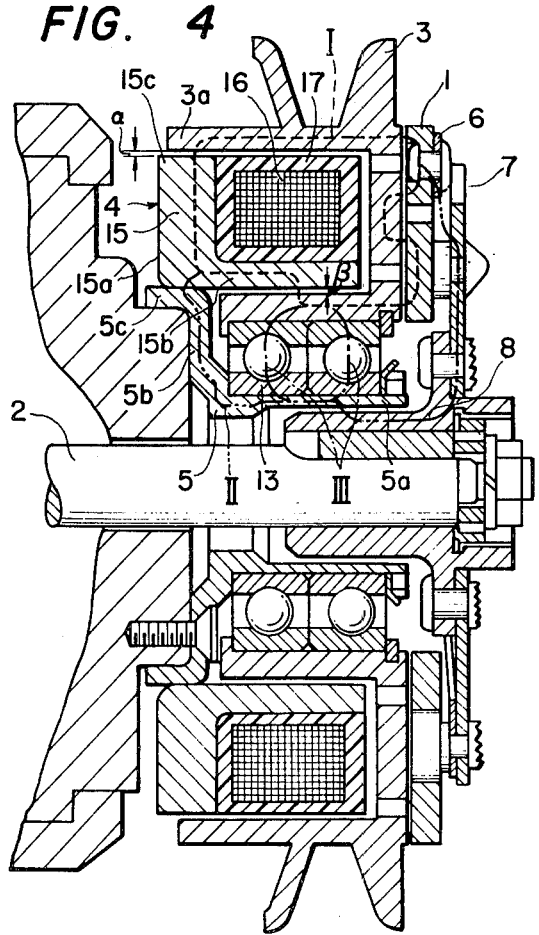

4,150,738

ELECTROMAGNETIC CLUTCH

BACKGROUND OF THE INVENTION

This invention relates to an electromagnetic clutch, particularly an electromagnetic clutch for selectively transmitting rotation of an automobile engine to a compressor used for automobile cooling apparatus.

This kind of electromagnetic clutch usually comprises a clutch disc connected to a rotary shaft; a rotor or pulley means including a belt receiving portion, an annular portion facing the clutch disc with a gap and a cylindrical bearing receiving portion; and a stator which is secured to the compressor and includes an electromagnet and a cylindrical portion rotatably supporting the rotor through a bearing. The stator of this type is shown in U.S. Pat. No. 3,703,227, wherein the stator except windings, that is, a stator frame has a flange (71) and ring (75) as a U-shaped core for containing a winding therein; a flat portion 74; and a small ring (76). The small ring (76) supports the bearing receiving portion of the rotor through the bearing, and the outer face of the bearing receiving portion faces the inner face of the ring (75) with a small air gap to establish a magnetic flux passage, so that the inner face of the ring (75) and the outer face of the small ring (76) must be precisely finished. Further the flange (71) face also faces the stator with a small gap to establish a magnetic flux passage, so that a precise relation between the flange (71), the ring (75) and the small ring (76) must be made.

The stator flame comprises three parts and need two junctures, so that assemblying of the stator flame is laborious.

As stated above, the stator flame has a plurality of faces which each belong to different parts and need accurated concentricity to each other. Therefore, on bases of one of the faces the other faces need be machined precisely, so that the machining is laborious.

Further, the stator flame is made such that a part of the stator flame bridging from the flange (71) to the small ring (75) is made of one piece of low carbon steel, and the small ring (76) also is made low carbon steel since the piece is junctioned by friction welding and the juncture must be strong. Therefore, since the magnetic circuit results in magnetic flux passing through the small ring, a resultant loss of magnetic flux amounting to about 17-18% occurs whereby the electromagnetic clutch effects decreased performance.

SUMMARY OF THE INVENTION

An object of the invention is to provide an electromagnetic clutch which has a high productibility without decrease of frictional clutch force.

Another object of the invention is to provide an electromagnetic clutch which has a high productibility with less juncture as compared with the prior art as mentioned above.

Another object of the invention is to provide an electromagnetic clutch which has a high productibility with less machining portions.

Another object of the invention is to provide an electromagnetic clutch which is small in magnetic flux loss.

A feature of an electromagnetic clutch according to the present invention is that a core member of one piece and a supporting member of one piece are tightly inserted and made a stator flame assembly. The stator flame is fixed to a machine or apparatus, support rotatably rotor means, such as a pulley member, and holds therein an exciting coil.

BRIEF DESCRIPTION OF THE DRAWINGS

FIG. 1 is a section view of an embodiment of an electromagnetic clutch according to the present invention;

FIG. 2 is a section view of a stator flame assembly employed in the electromagnetic clutch in FIG. 1;

FIG. 3 is a section view of another embodiment of the stator flame assembly as shown in FIG. 2; and FIG. 4 is a section view of another embodiment of the electromagnetic clutch according to the present invention.

DESCRIPTION OF THE PREFERRED EMBODIMENTS

Referring to FIGS. 1 and 2, an embodiment of the electromagnetic clutch according to the present invention will be described hereinafter in detail.

In FIG. 1 the electromagnetic clutch comprises a clutch disc including armature 1 connected to a rotary shaft 2, a rotor of a pulley 3, an electromagnet 4, and a supporting member 5. Torque of the pulley 3 driven by a driving source such as an engine, motor, etc., is selectively transmitted to the rotary shaft 2 by frictional engagement of the armature 1 with pulley 3. A force for the frictional engagement is generated by selectively energizing of the electromagnet 4.

The armature 1 with an annular shape is made of magnetic material and mounted on a holding plate 7 through leaf springs 6 thereby permitting the armature 1 to limitedly move axially of the rotary shaft 2. The holding plate 7 is secured to a hub 8 fixed to the rotary shaft 2 by a key 9 and a screw means 10.

The electromagnet 4 is generally cylindrical and comprises a core member 41 which is cylindrical as a whole, U-shaped in its section and has an annular space 41d defined by an inner cylindrical portion 41c, a bottom portion 41a spreading out from one end of the inner cylindrical portion 41c and an outer cylindrical portion 41b, and an exciting coil 42 which is inserted in the annular space 41d and burried with insulating resin 43. The core member 41 is made of annular plate of low carbon steel by press working. When formed the inner and outer cylindrical portions 41c and 41b are made precisely coaxially.

The supporting member 5 has a sleeve portion 5a, a flange portion 5b spreading out from one end of the sleeve portion 5a, and a bent portion 5c formed at the outer end of the flange portion 5b. The supporting member 5 is made of aluminum alloy by cold or hot forging. The supporting member 5 is tightly inserted to be press-fitted in the core member 41 from the bottom portion 41a to make a stator flame assembly. The stator flame assembly has an annular space defined by the supporting member 5 and the inner cylindrical portion 41c of the core member 41.

After assembled in the stator flame assembly, a face E of the supporting member 5 is finished by machining on a basis of faces A and B of the core member 41, whereby faces A, B and C are made precisely coaxially. An inner face C of the bent portion 5c and a face D perpendicular to the face C are finished precisely by machining on a basis of the faces A and B, thereby providing a recess for engagement with a machine part such as a compressor casing 12. The exciting coil 42 is inserted in the annular space 41d and fixed with the insulating resin 43 whereby an assembly of the electromagnet 4 and supporting member 5 is completed. The assembly of the electromagnet 4 and supporting member 5 is fitted to the machine part 12 by screw means 11.

The supporting member 5 carries a bearing 13 fitted to the sleeve portion 5a and supports the pulley member 3 through the bearing 13.

The pulley member 3 comprises a cylindrical portion of a rim 3a with a belt receiving grooves 3b, a sleeve portion 3d mounting the bearing 13 thereon and an annular pole portion 3c portion engages with the armature 1. The cylindrical portion 3a and the sleeve portion 3d of the pulley member 3 face to the outer and inner cylindrical portion with small air gaps $\alpha$ and $\beta$, respectively, so that magnetic flux produced in the core member 41 flows into the pulley member 3 through the air gaps $\alpha$ and $\beta$, as shown by a dotted line I.

A face F of the supporting member 5 is finished by forging, an air gap $\gamma$ is larger than the air gaps $\alpha$ and $\beta$.

Upon energizing the electromagnet 4, the magnetic flux produced in the core follows along the dotted line 1, which results in causing the armature 1 to contact with the pole portion of the pulley member to make a frictional coupling between the pulley member 3 and the armature 1, whereby torque of the pulley member is transmitted to the rotary shaft 2 through the plate springs 6, the holding plate 7 and the hub 8.

In order to make resistance of the magnetic circuit small, it is necessary to make each of the air gaps $\alpha$ and $\beta$ small. Therefore, the outer and inner cylindrical portions 41b and 41c of the core member 41, the cylindrical portion 3a, and sleeve portion 3d of the pulley member 3 and the sleeve portion 5a of the supporting member 5 are made strictly coaxially.

In the above embodiment of the present invention, the assembly of the core member 41 and the supporting member 5a corresponding to the stator flame comprises two parts assembled so that the juncture of them is one. Therefore, assembling of the two parts is extremely simplified.

Further, the assembly of the core member 41 and supporting member 5 which concentricity is needed comprises two parts one of which is precisely finished by press-forming without machining, so that the other part only needs machining. Additionally, the two portion of the part to be finished by machining is done machining on a basis of the same faces. Therefore, finishing can be done efficiently.

Still further, since the supporting member is made of non-magnetic material of aluminum alloy, magnetic flux loss followed in magnetic circuits II, III is reduced (to 5–10% in a result really measured). Accordingly, the electromagnetic clutch is raised in its performance.

The core member 41 and the supporting member 5 can be joined by welding, in such a case the supporting member of the same material as the core member is preferred. Even in the case of use of low carbon steel, the magnetic flux loss is reduced by about 5% as compared with one in the prior electromagnetic clutch.

In the supporting member 5, it is capable to make the recess 14 defined by the bent portion 5c and the flange portion 15b deeper (as shown by L in FIG. 2) by forging longer bent portion 15c, whereby the electromagnetic clutch is tightly fixed to the casing 12 so that eccentricity due to vibration is not brought and its liability and life are improved.

Next, another embodiment of the present invention will be described referring to FIG. 3. In FIG. 3, a supporting member 51 comprises a sleeve portion 51c and a flange portion 51b. The core member 41 has a recess portion 41e made in the inner cylindrical portion 41c thereof. The supporting member 51 is secured to the core member 41 with flange portion end 51c of the supporting member 51 tightly inserted in the inner cylindrical portion 41c on a basis of the faces A and B.

Machining of a face E of the supporting member 51 is done in the same manner as one in FIG. 2, but faces C and D defining an engagement recess 14 is not necessary to machine because the faces C and D is made at right angle. The supporting member 51 has no bent portions at the end of the flange portion 51b so that forging is easy.

Further, another embodiment of the present invention will be described referring to FIG. 4. In this embodiment, an electromagnet 4 only is different from one shown in FIGS. 1 and 2. The electromagnet 4 has a core member 15 which is L-shaped in section and has an inner cylindrical portion 15b, a bottom portion 15a spreading out from the inner cylindrical portion 15b, and an exciting coil 16 which is put on the inner cylindrical portion 15b and burried with resin 17. The bottom portion 15a is more thick than the inner cylindrical portion, and the end 15c of the bottom is cylindrical and opposes to the cylindrical portion 3a of the pulley member 3 with a small air gap, whereby the magnetic flux produced in the core member 15 flows into the pulley member 3 through the air gap.

What is claimed is:

1. An electromagnetic clutch comprising:
   clutch disc means connected to a rotary shaft;
   a rotor including a sleeve portion coaxially mounted with respect to the rotary shaft and supported on a bearing, a pole face portion extending radially outwardly from one end of the sleeve portion, and a cylindrical portion extending coaxially with respect to the rotary shaft from an outer end portion of the pole face portion toward the other end of the sleeve portion thereby defining an annular space;
   a one piece finished core member, said core member being disposed in the annular space and having an inner cylinder portion one end of which is extended toward the pole face portion of the rotor so that the inner cylindrical portion faces the sleeve portion of the rotor with a small air gap therebetween, a bottom portion extending outwardly from the other end of the inner cylindrical portion of the core member, and an outer cylindrical portion having a cylindrical outer face which faces the cylindrical portion of the rotor with a small air gap;
   an excitor supported by the core member for exciting the core member; and
   a one piece supporting member including a sleeve portion extending coaxially surrounding the rotary shaft extending outwardly from one end of the sleeve portion and forcibly tightly inserted in the inner cylindrical portion of the core member so as to define an annular space within which the sleeve portion of the rotor is received, the flange portion having an engagement portion thereon for engaging said inner cylindrical portion of the core.

2. The electromagnetic clutch as defined in claim 1, wherein the rotor means comprises a pulley with a belt receiving groove on the cylindrical portion thereof.

3. The electromagnetic clutch as defined in claim 1, wherein the supporting member is made of non-magnetic material.

4. The electromagnetic clutch as defined in claim 2, wherein the core member is U-shaped in its section, and the outer cylindrical portion of the core member is extended coaxially of the inner cylindrical portion of the core member toward the pole face portion of the rotor member.

5. The electromagnetic clutch as defined in claim 2, wherein the outer cylindrical portion of the core member is an end portion of the spreading out portion.

6. The electromagnetic clutch as defined in claim 4, wherein the core member has an annular recess in the inner cylindrical portion thereof at the spreading out portion, and the flange portion of the supporting member is tightly inserted in the annular recess to make the engagement recess defined by the annular recess and the flange portion of the supporting member.

7. The electromagnetic clutch as defined in claim 4, wherein the flange portion of the supporting member is at the end thereof in a bent shape such that the engagement portion is defined.

8. The electromagnetic clutch as defined in claim 4, wherein the supporting means is made of aluminum alloy.

9. The electromagnetic clutch as defined in claim 4, wherein both of the inner and outer cylindrical portion are finished by press working.

10. An electromagnetic clutch comprising:
   clutch disc means connected to a rotary shaft;
   a rotor having a pole face, and inner walls defining an annular cavity therein, said rotor being supported coaxially about said shaft;
   an annular one piece core member disposed about said shaft in said annular cavity;
   an excitor supported on said core member within said annular cavity;
   an annular one piece supporting member formed of a non-magnetizable material for supporting said rotor for relative rotation therebetween; and
   force fit means for securing said core member to said supporting member, said force fit means being formed by an outer cylindrical surface of said supporting member being dimensioned so as to fit tightly within an inner surface of said core member.

11. An electromagnet according to claim 10, wherein said non-magnetic material is aluminum.

12. An electromagnetic clutch according to claim 10, wherein said core member is U-shaped in section.

13. An electromagnetic clutch according to claim 10, wherein said outer surface of said supporting member is a flange portion extending from a sleeve portion of said supporting member.

14. An electromagnetic clutch according to claim 13, wherein the flange portion of the supporting member is at the end thereof in a bent shape such that the engagement portion is defined.

15. An electromagnetic clutch comprising:
   clutch disc means connected to a rotary shaft;
   a rotor having a pole face, and inner walls defining an annular cavity therein, said rotor being supported coaxially about said shaft;
   an annular one piece core member disposed about said shaft in said annular cavity;
   an excitor supported on said core member within said annular cavity;
   an annular one-piece supporting member for supporting said rotor for relative rotation therebetween said supporting member being secured within said core member; and
   wherein said annular support member is formed of a non-magnetizable material.

16. An electromagnet according to claim 16, wherein said non-magnetic material is aluminum.

* * * * *

UNITED STATES PATENT AND TRADEMARK OFFICE
CERTIFICATE OF CORRECTION

PATENT NO. : 4,150,738
DATED : April 24, 1979
INVENTOR(S) : Kosaku SAYO, et al.

It is certified that error appears in the above-identified patent and that said Letters Patent are hereby corrected as shown below:

Title page, as it reads now:

[30]   Foreign Application Priority Data

December 8, 1976   Japan......... 50-145088

Title page, as it should read:

[30]   Foreign Application Priority Data

December 8, 1975   Japan......... 50-145088

Signed and Sealed this

Thirty-first Day of July 1979

[SEAL]

Attest:

LUTRELLE F. PARKER
Attesting Officer
Acting Commissioner of Patents and Trademarks